United States Patent
Knowles et al.

(10) Patent No.: US 8,648,308 B2
(45) Date of Patent: Feb. 11, 2014

(54) IR CAMERA SYSTEM AND METHOD

(75) Inventors: Peter Knowles, Basildon (GB); Jeremy Crouch, Basildon (GB)

(73) Assignee: Selex ES Ltd., Basildon, Essex (GB)

( * ) Notice: Subject to any disclaimer, the term of this patent is extended or adjusted under 35 U.S.C. 154(b) by 87 days.

(21) Appl. No.: 13/203,798

(22) PCT Filed: Feb. 26, 2010

(86) PCT No.: PCT/EP2010/052483
§ 371 (c)(1),
(2), (4) Date: Aug. 29, 2011

(87) PCT Pub. No.: WO2010/097461
PCT Pub. Date: Sep. 2, 2010

(65) Prior Publication Data
US 2011/0315881 A1    Dec. 29, 2011

(30) Foreign Application Priority Data
Feb. 27, 2009 (GB) .................... 0903293.9

(51) Int. Cl.
*G01J 5/02* (2006.01)
*H01L 31/00* (2006.01)

(52) U.S. Cl.
USPC .................. 250/352; 250/340; 250/338.4

(58) Field of Classification Search
USPC ...................... 250/352, 340, 338.4
See application file for complete search history.

(56) References Cited

U.S. PATENT DOCUMENTS

| | | | |
|---|---|---|---|
| 5,373,151 A | 12/1994 | Eckel, Jr. et al. | |
| 5,512,750 A * | 4/1996 | Yanka et al. | 250/338.4 |
| 5,532,484 A * | 7/1996 | Sweetser et al. | 250/332 |
| 5,682,035 A | 10/1997 | Gallagher et al. | |
| 6,515,285 B1 * | 2/2003 | Marshall et al. | 250/352 |
| 2003/0146975 A1 | 8/2003 | Joung et al. | |
| 2008/0231719 A1 | 9/2008 | Benson et al. | |

FOREIGN PATENT DOCUMENTS

EP    0 762 746 A2    3/1997

OTHER PUBLICATIONS

International Search Report (PCT/ISA/210) issued on Jun. 4, 2010, by European Patent Office as the International Searching Authority for International Application No. PCT/EP2010/052483.
Breniere et al., "Reliability optimization for IR detectors with compact cryo-coolers", Infrared Technology and Applications XXXI, 2005, pp. 187-198, vol. 5783.

* cited by examiner

*Primary Examiner* — David Porta
*Assistant Examiner* — Mindy Vu
(74) *Attorney, Agent, or Firm* — Buchanan Ingersoll & Rooney PC

(57) ABSTRACT

An Infra Red (IR) camera and method of operating the same is disclosed. The camera includes a detector having an infrared focal plane array (IRFPA). The camera is operated in such a fashion, implemented in software, to maximize the detector operating temperature under varying scene temperature and atmospheric conditions in order to achieve a predetermined and adequate level of sensitivity and operability from the detector.

12 Claims, 1 Drawing Sheet

IDCA - Integrated Detector Cooler Assembly
CPM - Camera Processing Module
DIM - Detector Interface Module
IPM - Interface Power Module
PSU - Power Supply Module

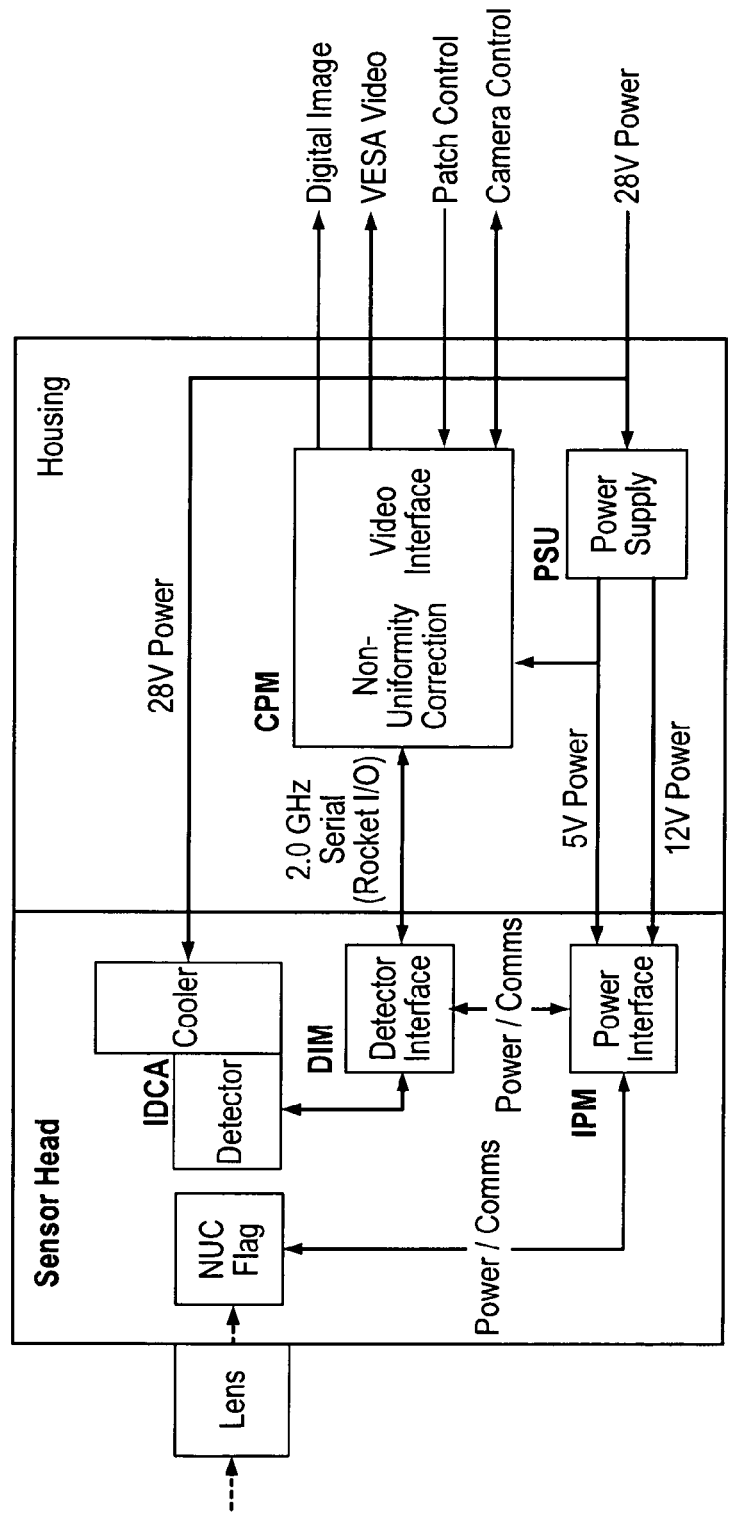

IR CAMERA SYSTEM AND METHOD

The invention relates to an Infra Red (IR) camera system and method. More specifically, but not exclusively, it relates to an IR camera system comprising a cooled IR detector in which the operating temperature is maximised under varying scene temperatures and atmospheric conditions in order to achieve a predetermined and adequate level of sensitivity and operability from the IR detector.

The mean time to failure of a typical modern IR imaging camera is usually dominated by the cooling engine that is needed to operate the infrared detector at cryogenic temperatures. Miniature cooling engines, usually operating on the principle of the Stirling cycle, have evolved rapidly over the last 20 years and are mainly of two types: those having rotary electric motors and those having linear motors.

Older camera designs relied on open-cycle Joule Thomson coolers fed by compressed air, which achieved operation at the boiling point of air, around 80K. Older camera types also employed mainly LWIR detectors, which required cooling to around 80K for adequate performance. Unsurprisingly, the cooling engines that have replaced the older cooler types have been designed to achieve infrared detector operation typically at 80K. Both cooler types are capable of achieving this, and in practice most camera designs cool the detector to a fixed temperature in this region.

The first cooler type has a life expectancy in the region of five thousand operating hours, typically limited by bearing life, whereas the second type can achieve a life of a few tens of thousands of hours in conjunction with specialised frictionless bearing designs that are possible with the linear motor configuration. The first type is generally the more compact, lightweight, and lower cost.

In some infrared camera applications, the reliability requirement of the camera is achieved through a planned maintenance regime, under which the cooling engines are replaced at fixed intervals in advance of their expected time to failure. Such an approach achieves reliability but at a cost.

In one form of the invention there is provided an IR camera comprising a cooling engine and an IR detector in which the cooling engine is operated in such a fashion so as to increase the life expectancy of said IR camera.

In a further form of the invention there is provided a method of maximising cooling engine life in an infrared (IR) camera comprising the steps of monitoring defects in the focal plane array (FPA); creating a defect map corresponding to the number of defects in the array at a range of temperatures; and varying camera gain so as to maintain the highest possible temperature of the cooling engine capable of maintaining a predetermined level of image quality.

In this way, the invention provides an alternative strategy for maintaining camera reliability by maximising cooler life.

The invention will now be described with reference to the accompanying diagrammatic drawings in which:

The FIGURE is a schematic block diagram showing the component parts of an IR camera in accordance with one form of the invention, the camera including a cooling engine controlled by controlling means.

Infrared cameras for terrestrial passive thermal imaging usually operate in one of two infrared wavebands corresponding to two atmospheric infrared transmission windows: the so-called mid-wave infrared or MWIR and long-wave infrared or LWIR wavebands, the former corresponding approximately to wavelengths between 3 and 5 µm and the latter between 8 and 12 µm.

Modern infrared cameras employ high performance cooled detectors that contain infrared focal plane arrays (IRFPAs), specifically arrays of photodiodes made from a range of semiconductor materials including, but not limited to, mercury cadmium telluride (MCT) and indium antimonide (InSb). Other detector types include bandgap engineered structures such as photoconducting quantum well infrared photodetectors (QWIPs) in the gallium arsenide/aluminium gallium arsenide semiconductor materials system.

The underlying physics of the temperature dependence of infrared detector operation includes factors such as the semiconductor bandgap and the densities of states of electronic energy levels involved in infrared absorption. The physics of the detector materials given as examples above is well understood and it is possible to rank these examples in general terms in the order of their maximum useful operating temperatures.

The ranking, in order of highest to lowest operating temperature, is MWIR MCT, followed by LWIR MCT and InSb, then LWIR QWIP (it should be noted that the composition of MCT and QWIP detectors can be tuned independently for the MWIR and LWIR bands). The ranking of LWIR MCT and InSb (which operates in the MWIR waveband only) is unclear from the underlying physics and depends on the detailed manufacturing technology.

From this ranking it is expected that the greatest usefulness of the invention will be achieved with MWIR MCT infrared detectors. In fact, useful performance in MWIR MCT detectors can be achieved at temperatures as high as 150K. At the other extreme, LWIR QWIP detectors operate typically around 65K and little useful performance is reported above around 75K.

An important characteristic of IRFPAs is the spread of performance among the individual pixels of the array. Those pixels with the poorest sensitivity, for example due to high noise, are usually classed as 'dead pixels' and deselected from the displayed image, using some method of substitution by neighbouring pixels to compensate for the loss of cosmetic image quality. The co-ordinate addresses of the dead pixels within the array can be stored in the form of a 'defect map'.

An increase in operating temperature tends to increase the noise in the IRFPA through thermal generation and in particular to increase the number of dead pixels. When the number of dead pixels requiring deselection becomes too numerous, the method of substitution becomes increasing ineffective in restoring the cosmetic quality and sets a limit to the maximum operating temperature.

One embodiment of the invention is based on a camera strategy, implemented in software, to maximise the detector operating temperature under varying scene temperature and atmospheric conditions in order to achieve a predetermined and adequate level of sensitivity and operability from the detector.

For example, under conditions of low thermal contrast, due to a lack of solar heating of the scene, combined with low atmospheric transmission due to wet weather conditions, a camera equipped with automatic gain control will apply high gain to achieve the required grey scale image in the display.

Under high gain, the noise level in the displayed image is also amplified and the image quality tends to be degraded compared with conditions of high thermal contrast, particularly by the noisiest pixels in the IRFPA. Under these conditions it is beneficial maintain the operating temperature as low as possible to minimise the number of dead pixels.

However, under conditions of high thermal contrast, the automatic gain setting is low, the influence of noise in the image lessens, and a more relaxed noise threshold can be declared for dead pixels in proportion to the change in camera gain. Under these conditions, the number of pixels declared dead and the amount of pixel substitution reduce, improving image cosmetic quality. Under these conditions the number of dead pixels may be significantly below its acceptable limit.

As an alternative to the improvement in image quality, the IRFPA temperature can be raised until the number of dead pixels rises back to the acceptable limit. This strategy ensures that through the use of a variable defect definition, linked to the camera gain, the highest possible operating temperature is employed under all conditions to maximise cooler life while maintaining acceptable image quality.

The camera operation can be automated, for example by linking a set of IRFPA operating temperatures and a set of predetermined defect definitions to a set of predetermined camera gain intervals. The operating temperature and defect map can therefore be updated each time the camera's automatic gain switches between intervals, by invoking an appropriate set of stored dead element co-ordinates or by performing a calibration to refresh the defect map, using the appropriate predetermined defect definitions.

It will be appreciated that the invention need not be limited to IR cameras operating in the abovementioned wavebands. The invention may be used in cameras operating at other wavelengths. Whilst the invention may be applicable to many wavelengths, in the present application it is envisaged that it will have greater potential for extending cooler life in the MWIR waveband.

Furthermore, it will be appreciated that the present invention is applicable to any detector type to the extent that its performance as a function of operating temperature can be adequate over an extended operating temperature range for a chosen application. However, the usefulness of the invention may be greatest among detector types that provide adequate performance at the highest possible operating temperatures.

An additional benefit of higher temperature operation is the reduction in power consumption by the cooler.

The invention claimed is:

1. An infrared (IR) camera comprising:
   a cooling engine; and
   an infrared (IR) detector configured with a set of defect definitions to be selected, the detector including an Infrared Focal Plane Array (IRFPA) detector having defects that are to be affected by a temperature of the cooling engine during operation, each defect being mapped to at least one defect definition and linked to camera gain such that a corresponding defect definition is selected each time camera gain switches between intervals, and based on the selected defect definition a highest possible operating temperature is employed under all conditions to maximize cooling engine life while maintaining acceptable image quality.

2. The IR camera according to claim 1, in which the IR detector of the camera is configured for operation in mid-wave IR or long-wave IR wavebands.

3. The IR camera according to claim 1, in which the detector comprises:
   infrared focal plane arrays (IRFPAs).

4. The IR camera according to claim 3, comprising:
   arrays of photodiodes.

5. The IR camera according to claim 4, in which the photodiodes comprise:
   semiconductor materials.

6. The IR camera according to claim 5, wherein the semiconductor materials comprise:
   at least one of mercury cadmium telluride or indium antimonide.

7. A method of maximizing cooling engine life in an infrared (IR) camera comprising:
   monitoring defects in a focal plane array (FPA);
   creating a plurality of defect maps, each map corresponding to a number of defects in the array for a given camera gain at a range of temperatures;
   selecting one of the plurality of defect maps at each gain interval; and
   varying a temperature of the FPA in response to the applied camera gain based on the selected defect map so as to maintain a highest possible temperature of the cooling engine capable of maintaining a predetermined level of image quality.

8. The method according to claim 7, comprising:
   operating in mid-wave IR or long-wave IR wavebands.

9. The method according to claim 7, comprising:
   detecting with infrared focal plane arrays.

10. The method according to claim 9, wherein the infrared focal plane arrays comprise photodiodes.

11. The method according to claim 10, wherein the photodiodes comprise semiconductor materials.

12. The method according to claim 11, wherein the semiconductor materials comprise at least one of mercury cadmium telluride or indium antimonide.

* * * * *